United States Patent Office 3,112,336
Patented Nov. 26, 1963

3,112,336
PREPARATION OF ORTHOBORATE ESTERS AND ALCOHOLS BY CLEAVAGE OF THE CORRESPONDING CYCLIC ETHERS
Janos Kollonitsch, Westfield, N.J., assignor to Merck & Co., Inc., Rahway, N.J., a corporation of New Jersey
No Drawing. Filed Jan. 3, 1961, Ser. No. 79,979
9 Claims. (Cl. 260—462)

This invention relates to a process for cleaving cyclic ethers and, more particularly, to a process of reductive splitting of cyclic ethers having from 4 to 6 atoms in the ring by reaction of such compounds with diborane.

The object of the present invention is to provide a method of cleaving cyclic ethers.

According to the present invention, cyclic ethers are reductively cleaved by the reaction with diborane to produce the corresponding orthoborate ester. Subsequent hydrolysis of the ester yields the corresponding alcohol. The method of cleaving cyclic ethers described herein is carried out on saturated ether nuclei which have from 4 to 6 atoms in the nucleus. Illustrative ether nuclei utilized herein are trimethylene oxide, tetrahydrofuran and pentamethylene oxide. The process is carried out by reacting diborane with the ether at elevated temperatures, preferably at about 40° C. or higher, for about 20 hours or longer, depending upon the reaction temperature employed.

The process of the present invention may be summarized by the following chemical equations in which 2-methyltetrahydrofuran is used for purposes of illustration and not of limitation.

(1)

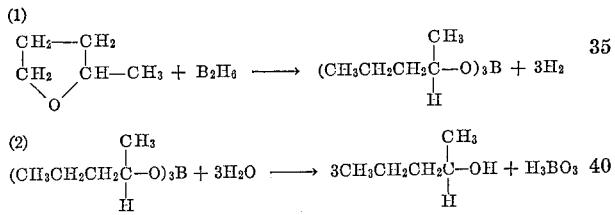

(2)
$$(CH_3CH_2CH_2\underset{H}{\overset{CH_3}{C}}-O)_3B + 3H_2O \longrightarrow 3CH_3CH_2CH_2\underset{H}{\overset{CH_3}{C}}-OH + H_3BO_3$$

*Example I.—Cleavage of Tetrahydrofuran With Diborane*

Diborane (0.63 g.) is introduced into dry tetrahydrofuran (28 g.). The solution is enclosed in a Carius tube and heated at 60° for 64 hours. The excess tetrahydrofuran is then distilled off in vacuo and the residue distilled at 58–60° and 1 mm. pressure. 6.4 g. of n-butylborate is obtained and identified by its infrared spectrum.

*Example II.—Cleavage of 2-methyltetrahydrofuran With Diborane*

Diborane (0.70 g.) is introduced into 28 g. of dry 2-methyltetrahydrofuran and the solution is heated at 60° for 40 hours in a Carius tube. The excess tetrahydrofuran is then distilled off in vacuo and the residue distilled at 58–60° and 1 mm. pressure. Secondary amylborate is obtained in good yield. The ester is then hydrolyzed to produce sec.-pentanol.

*Example III.—Cleavage of Trimethylene Oxide With Diborane*

Diborane (1.2 g.) is introduced into pure, dry trimethylene oxide (63 g.). The solution is then heated in a Carius tube at 50° for 32 hours. After distilling off the excess of the trimethylene oxide in vacuo the residual oil is distilled at 36–38° under 2 mm. of pressure. 11.6 g. of n-propylborate is obtained.

*Example IV.—Cleavage of Pentamethylene Oxide With Diborane*

A solution of 0.82 g. of diborane in 57 g. of pentamethylene oxide is heated in a Carius tube for 64 hours at 60°. The excess of pentamethylene oxide is distilled off and the residue distilled in vacuo to give 8.1 g. of tri-n-pentylborate, B.P. 66–68° at 1 mm.

*Example V.—Cleavage of Cyclic Ether Derivatives With Diborane*

Following the procedure described above, the halo, hydroxyl, carboxyl, cyano, thio and carbonyl derivatives of trimethylene oxide, tetrahydrofuran and pentamethylene oxide are cleaved with diborane to produce the corresponding reduced form of the particular ether.

*Example VI.—Cleavage of Fused Ring Cyclic Ethers With Diborane*

Following the procedure described above, tigogenin is cleaved with diborane to produce the dihydroisospirostane of tigogenin.

It should be understood that various changes may be made in the present process as herein described without affecting the results attained. Thus, various modifications of conditions and various changes in procedure differing from those herein given as illustrative of the preferred embodiments of this invention may be made without departing from the scope thereof. Accordingly, the scope of this invention is to be determined in accordance with the prior art and the appended claims.

What is claimed is:

1. The method of cleaving cyclic ethers having a saturated carbon atom containing ether nucleus, the number of carbon atoms therein being a positive integer greater than two and less than six, which comprises reacting at elevated temperatures said cyclic ether with diborane to produce orthoborate esters and isolating said cleaved product.

2. The method according to claim 1 wherein said number of carbon atoms is three.

3. The method according to claim 1 wherein said number of carbon atoms is four.

4. The method according to claim 1 wherein said number of carbon atoms is five.

5. The method of cleaving cyclic ethers selected from the group consisting of trimethylene oxide, tetrahydrofuran and pentamethylene oxide, which comprises reacting at elevated temperatures said ether with diborane to produce orthoborate esters and isolating said cleaved product.

6. The method of cleaving derivatives of trimethylene oxide, tetrahydrofuran and pentamethylene oxide having a substituent selected from the group consisting of halo, hydroxy, carboxyl, cyano, thio and carbonyl, which comprises reacting at elevated temperatures said derivative with diborane to produce the orthoborane ester thereof and isolating said ester product.

7. The method of cleaving tigogenin which comprises reacting said compound with diborane to produce orthoborate esters and isolating said cleaved product.

8. The method of cleaving tetrahydrofuran which comprises reacting at elevated temperature said tetrahydrofuran with diborane to produce orthoborate esters and isolating said cleaved product.

9. The method of cleaving derivatives of trimethylene oxide, tetrahydrofuran and pentamethylene oxide having a substituent selected from the group consisting of halo, hydroxyl, carboxyl, cyano, thio and carbonyl, which comprises reacting at elevated temperatures said derivative with diborane to produce the orthoborane ester thereof and hydrolyzing the ester to the corresponding alcohol.

References Cited in the file of this patent

UNITED STATES PATENTS 2,874,165   Brown _____ Feb. 17, 1959

OTHER REFERENCES

Stone et al.: J. Chem. Soc. (London) pp. 2755-9 (1950).

Elliot et al.: J. Am. Chem. Soc., vol. 74, pp. 5211-2 (1952) (copies in Sci. Library).